US012311559B2

(12) United States Patent
Tan

(10) Patent No.: US 12,311,559 B2
(45) Date of Patent: May 27, 2025

(54) SAFETY SWITCH DEVICE

(71) Applicant: FANUC CORPORATION, Yamanashi (JP)

(72) Inventor: Qin Chen Tan, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 360 days.

(21) Appl. No.: 17/912,572

(22) PCT Filed: Apr. 23, 2021

(86) PCT No.: PCT/JP2021/016388
§ 371 (c)(1),
(2) Date: Sep. 19, 2022

(87) PCT Pub. No.: WO2021/220945
PCT Pub. Date: Nov. 4, 2021

(65) Prior Publication Data
US 2023/0158673 A1 May 25, 2023

(30) Foreign Application Priority Data
Apr. 28, 2020 (JP) .................................. 2020-079173

(51) Int. Cl.
*B25J 9/16* (2006.01)
*B25J 13/02* (2006.01)
(Continued)

(52) U.S. Cl.
CPC .......... *B25J 9/1674* (2013.01); *B25J 9/1664* (2013.01); *B25J 13/02* (2013.01); *H01H 9/0214* (2013.01);
(Continued)

(58) Field of Classification Search
CPC ....... B25J 13/02; B25J 9/1674; H01H 9/0214; H01H 13/14; G05B 19/409;
(Continued)

(56) References Cited

U.S. PATENT DOCUMENTS 5,788,202 A * 8/1998 Richter ............... B60R 11/0241
224/570
7,017,243 B2 * 3/2006 Carnevali .............. F16M 13/00
24/523
(Continued)

FOREIGN PATENT DOCUMENTS

CN 103677120 A 3/2014
CN 108426157 A * 8/2018 ........... F16M 11/041
(Continued)

OTHER PUBLICATIONS

International Search Report mailed Jun. 15, 2021, in corresponding to International Application No. PCT/JP2021/016388; 5 pages (with English Translation).

*Primary Examiner* — Tan Le
(74) *Attorney, Agent, or Firm* — Maier & Maier, PLLC

(57) ABSTRACT

A safety switch device including a device main body and a movable portion capable of moving in a predetermined moving direction. The device main body is provided with a back surface supporting portion having a supporting surface which supports a back surface of a mobile terminal, and a main-body-side holding portion which pushes one side of the mobile terminal, and the movable portion is provided with a movable-portion-side holding portion which pushes the other side of the mobile terminal, and each of the main-body-side holding portion and the movable-portion-side holding portion is provided with an inclined surface which comes into close contact with the mobile terminal, and each of the inclined surfaces inclines in a direction where the inclined surfaces get close to each other in the
(Continued)

moving direction as being distant from the supporting surface in the direction orthogonal to the supporting surface.

1 Claim, 10 Drawing Sheets

(51) Int. Cl.
*H01H 9/02* (2006.01)
*H01H 13/14* (2006.01)
*F16M 11/18* (2006.01)
*H04M 1/04* (2006.01)

(52) U.S. Cl.
CPC ............. *H01H 13/14* (2013.01); *F16M 11/18* (2013.01); *H04M 1/04* (2013.01)

(58) Field of Classification Search
CPC ........... G05B 2219/39439; G05B 2219/39447; H04M 1/04; B60R 11/0252; B60R 2011/0071; H05K 5/0204; F16M 11/16; F16M 11/18
See application file for complete search history.

(56) References Cited

U.S. PATENT DOCUMENTS

| | | | |
|---|---|---|---|
| 2003/0034429 A1 | 2/2003 | Carnevali | |
| 2006/0285306 A1* | 12/2006 | Carnevali | ............... H04M 1/04 361/759 |
| 2008/0296449 A1* | 12/2008 | Carnevali | ............... B60R 11/02 248/205.1 |
| 2011/0057083 A1* | 3/2011 | Carnevali | ............... G06F 1/163 248/274.1 |
| 2014/0166832 A1 | 6/2014 | Briant et al. | |
| 2016/0235190 A1 | 8/2016 | Briant et al. | |
| 2019/0299404 A1 | 10/2019 | Muneto | |

FOREIGN PATENT DOCUMENTS

| | | | |
|---|---|---|---|
| EP | 3456489 A1 | | 5/2017 |
| GB | 2293718 A | | 4/1996 |
| JP | H08-102779 A | | 4/1996 |
| JP | 2014033316 A | * | 2/2014 |
| JP | 2014-088092 A | | 5/2014 |
| JP | 2017-202550 A | | 11/2017 |
| JP | 2018-039625 A | | 3/2018 |
| WO | 2017195788 A1 | | 11/2017 |

* cited by examiner

SAFETY SWITCH DEVICE

TECHNICAL FIELD

This disclosure relates to a safety switch device.

BACKGROUND

There is a known robot operation unit which is removably attached to a commercially available mobile terminal and composes a teaching device of the robot (See Japanese Unexamined Patent Application, Publication No. 2017-202550, for example).

This robot operation unit includes an operation unit main body having an emergency stop button or the like, and an attachment which attaches the operation unit main body to the mobile terminal.

DETAILED DESCRIPTION OF THE EMBODIMENTS

In order to attach an operation unit main body to various mobile terminals of different sizes, an attachment is provided so as to be movable in a width direction of a mobile terminal with respect to an operation unit main body, and the mobile terminal is inserted between the operation unit main body and the attachment by resilient force of a coil spring.

The mobile terminal attached to the operation unit is not directly held by the operator, but is operated in a state in which the mobile terminal is indirectly held by holding the operation unit. Accordingly, it is preferable that the mobile terminal is not displaced not only in a direction of sandwiching by the operation unit main body and the attachment, but also in a three-dimensional direction with respect to the operation unit when the mobile terminal is operated by the operator.

One aspect of this disclosure is a safety switch device including a device main body; and a movable portion capable of moving in a predetermined moving direction with respect to the device main body, wherein the device main body is provided with a back surface supporting portion having a supporting surface which supports a back surface of a mobile terminal and a main-body-side holding portion which pushes one side of the mobile terminal in a state where the mobile terminal is supported by the back surface supporting portion, the movable portion is provided with a movable-portion-side holding portion which is located at a position opposite to the main-body-side holding portion in the moving direction and which pushes the other side of the mobile terminal, each of the main-body-side holding portion and the movable-portion-side holding portion is provided with an inclined surface which comes into close contact with the one side or the other side of the mobile terminal, each of the inclined surfaces inclines in a direction where the inclined surfaces get close to each other in the moving direction as being distant from the supporting surface in a direction orthogonal to the supporting surface, and a processing which makes an area of the supporting surface have a friction coefficient higher than that of surfaces of other portions of the device main body is performed, the area coming into close contact with the back surface of the mobile terminal.

A safety switch device 1 according to a first embodiment of the present invention will be described below with reference to the accompanying drawings.

Figure 1:
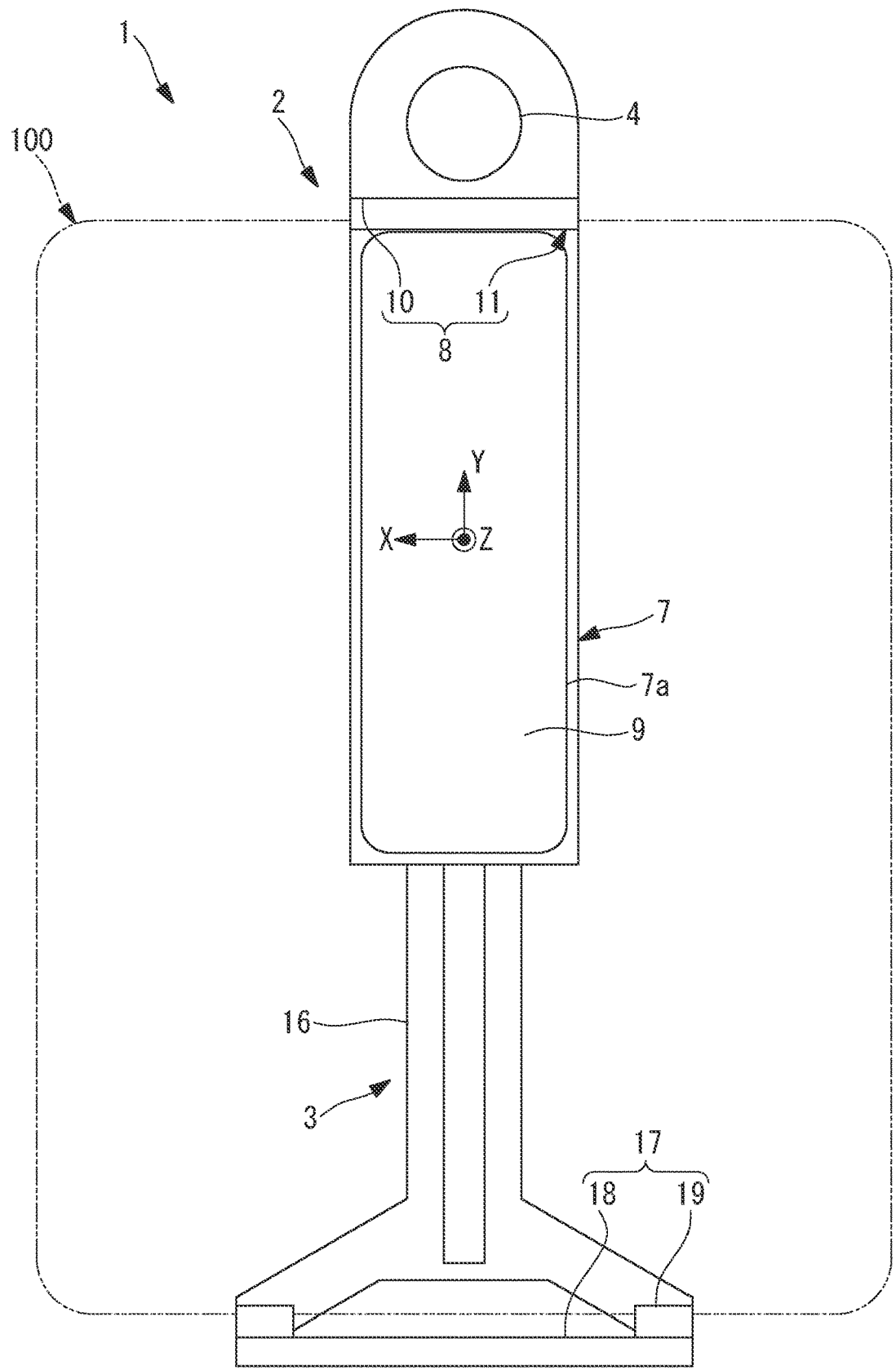
FIG. 1 is a front view showing a safety switch device according to a first embodiment of the present invention.

As shown in FIG. 1, the safety switch device 1 of this embodiment includes a device main body 2 having a longitudinal direction, and a slider (a movable portion) 3 which is attached to the device main body 2 so as to be movable along the longitudinal direction (moving direction: Y direction). The device main body 2 and the slider 3 are made of a hard plastic material, for example.

Figure 2:
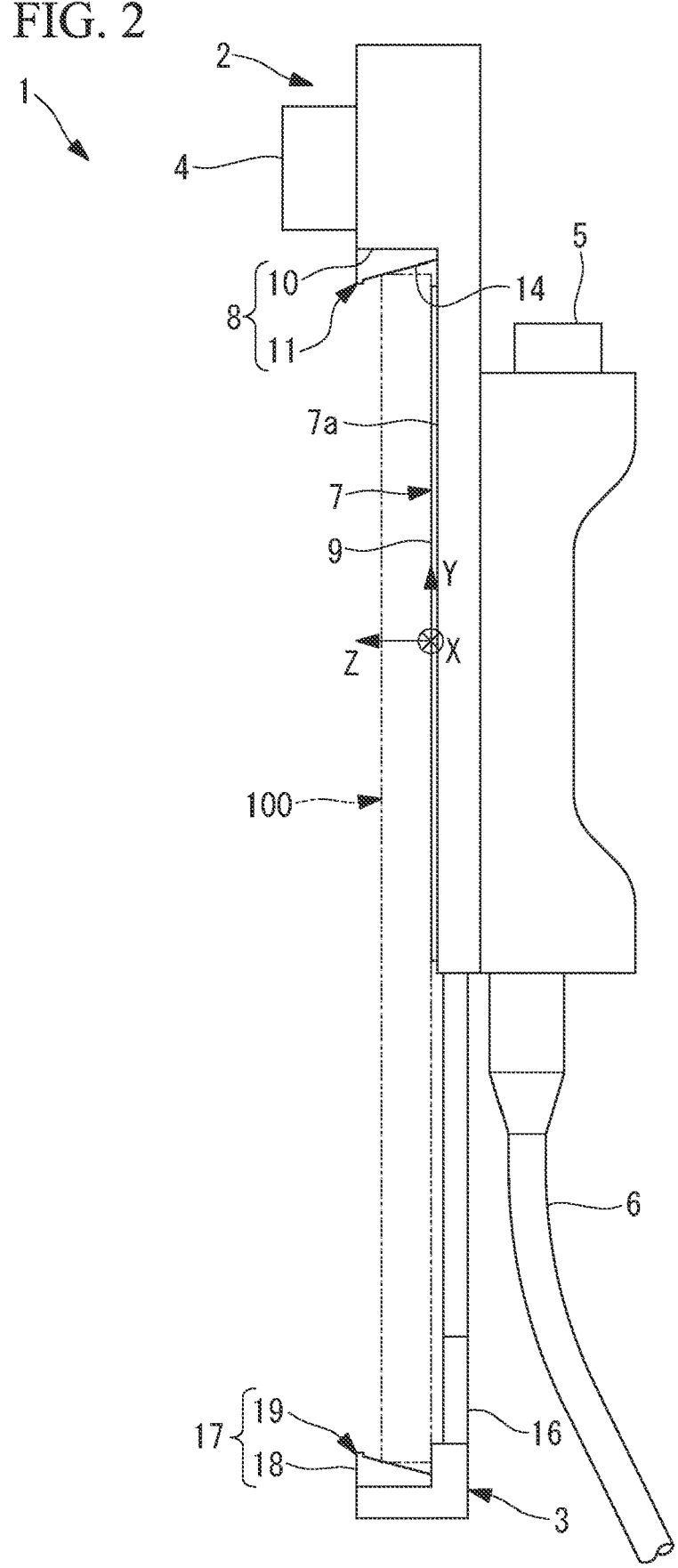
FIG. 2 is a side view of the safety switch device of FIG. 1.
Figure 3:
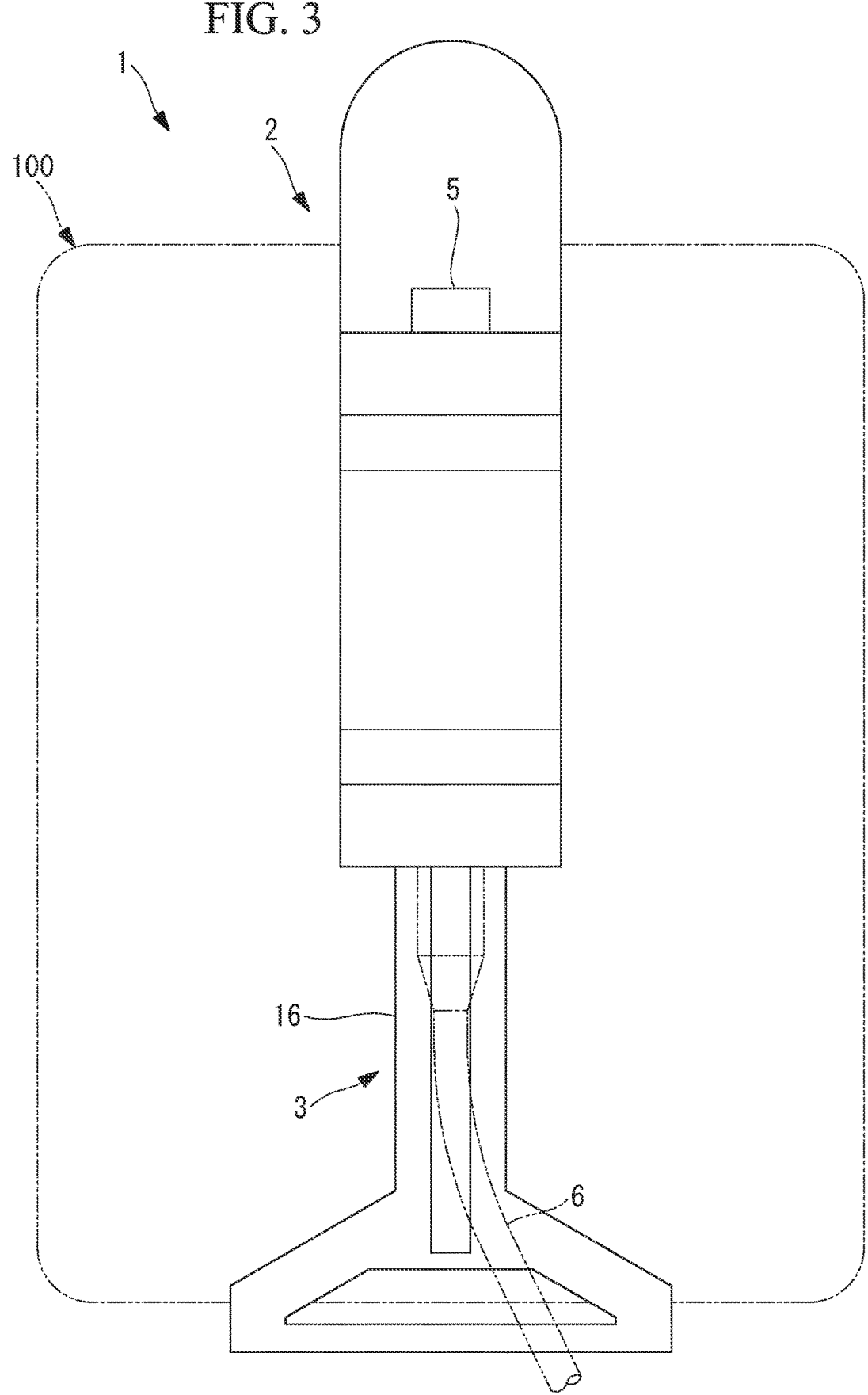
FIG. 3 is a rear view of the safety switch device of FIG. 1.

As shown in FIG. 1, the device main body 2 is provided with an emergency stop button 4 at a front surface side, and as shown in FIGS. 2 and 3, the device main body 2 is provided with a dead man switch 5 at a back surface side. The emergency stop button 4 is placed at a position in a vicinity of one end side of the device main body 2 in the longitudinal direction. A cable 6 for connecting the emergency stop button 4 and the dead man switch 5 to a control unit (not shown) is provided at the other end side of the device main body 2 in the longitudinal direction.

Figure 4:
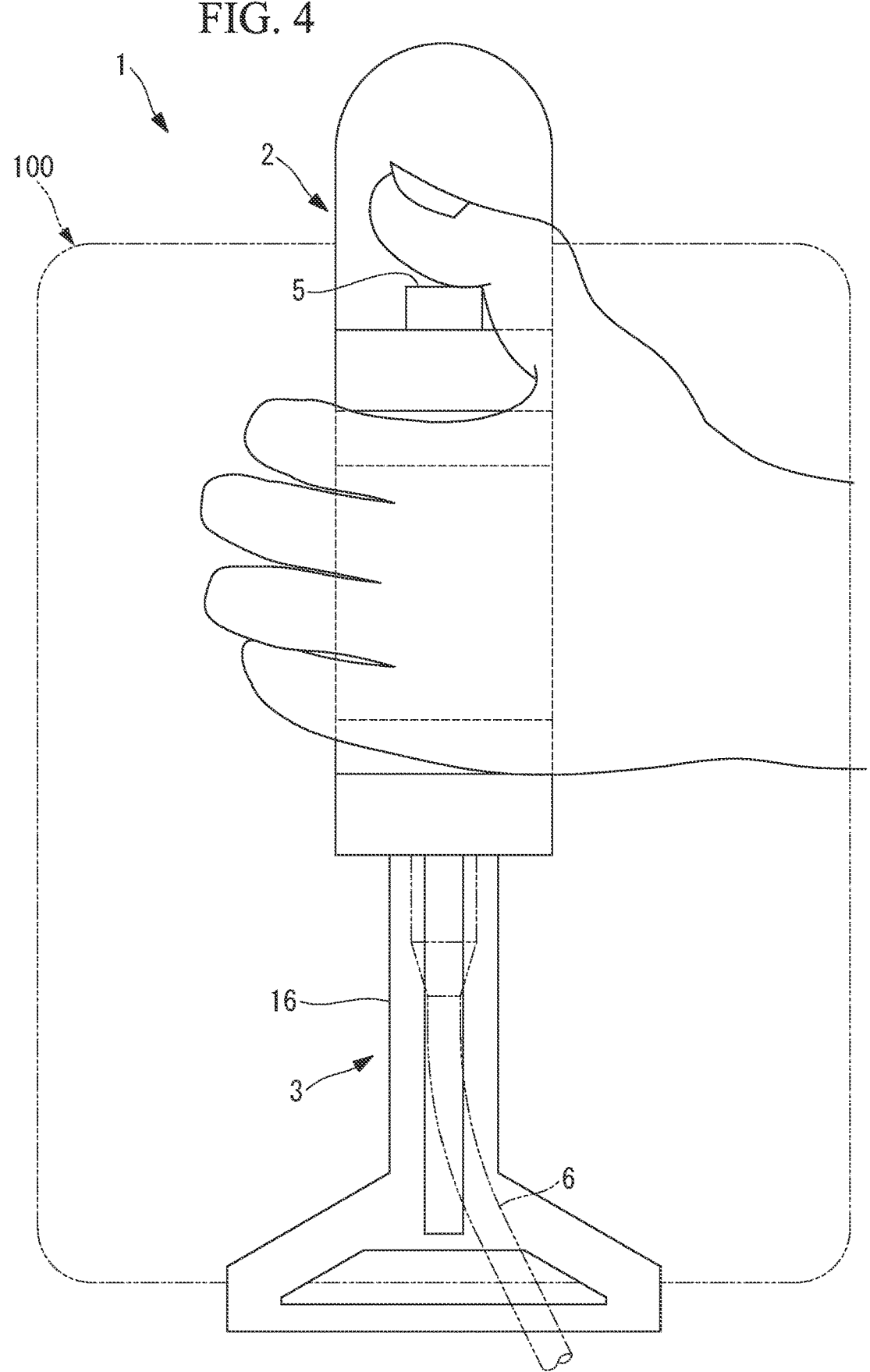
FIG. 4 is a rear view showing a state where a device main body of the safety switch device is held by an operator.

As shown in FIG. 4, the dead man switch 5 is placed at a position where a point finger or a thumb of the hand of an operator holding the device main body 2 is just placed when holding the device main body 2 in the right hand or the left hand. When the operator pushes the dead man switch 5 by using his/her point finger or thumb of the hand holding the device main body 2, operation of a mobile terminal 100 is allowed, and when the operator releases the finger from the dead man switch 5, the device main body 2 becomes in a state of emergency stop.

As shown in FIGS. 1 and 2, the front surface side of the device main body 2 is provided with a back surface supporting portion 7 which supports a back surface of the mobile terminal 100 when attaching the mobile terminal 100 to the device main body 2, and a first holding portion (main-body-side holding portion) 8 placed at one end side of the back surface supporting portion 7 in the longitudinal direction. The back surface supporting portion 7 includes a flat surface (a supporting surface) 7a extends in two directions which are a Y direction and an X direction orthogonal to the Y direction.

A sheet 9 made of a material, such as a silicon rubber, with higher friction coefficient than surfaces of the other portions of the device main body 2, is fixed to the flat surface 7a.

Figure 5:
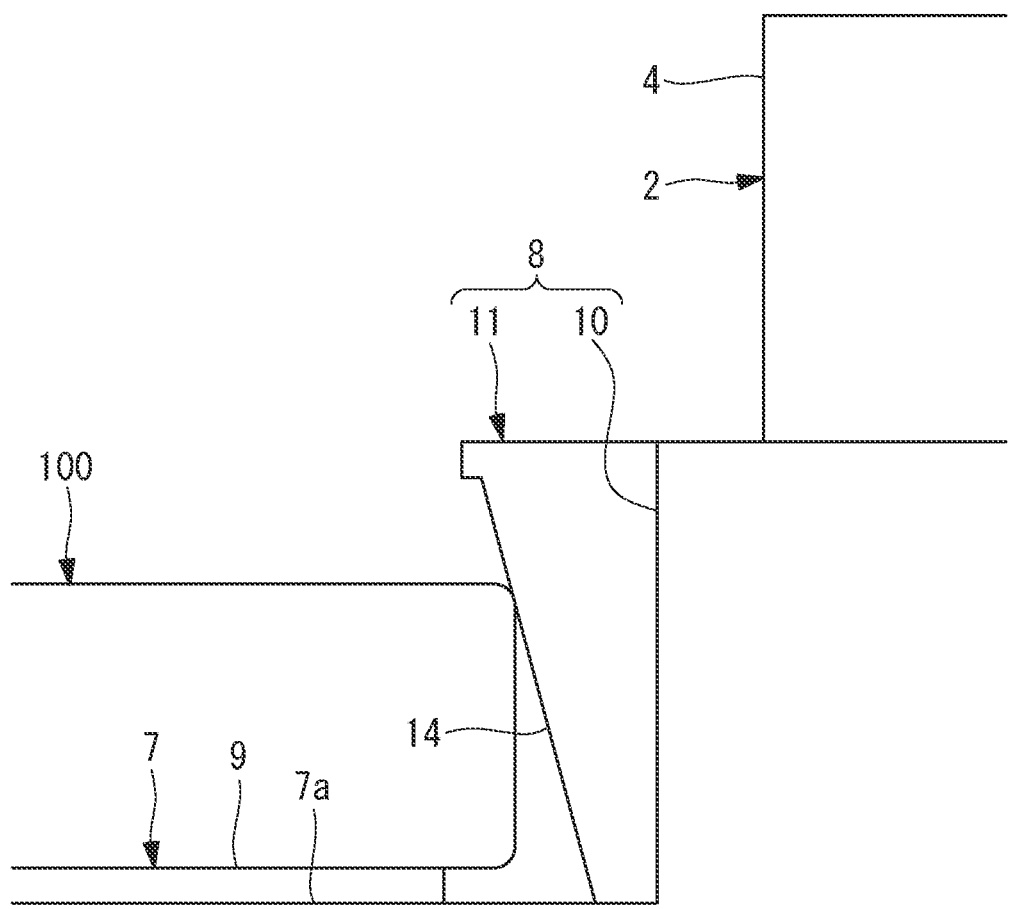
FIG. 5 is a partial enlarged view showing a first holding portion of the safety switch device of FIG. 1.
Figure 7:
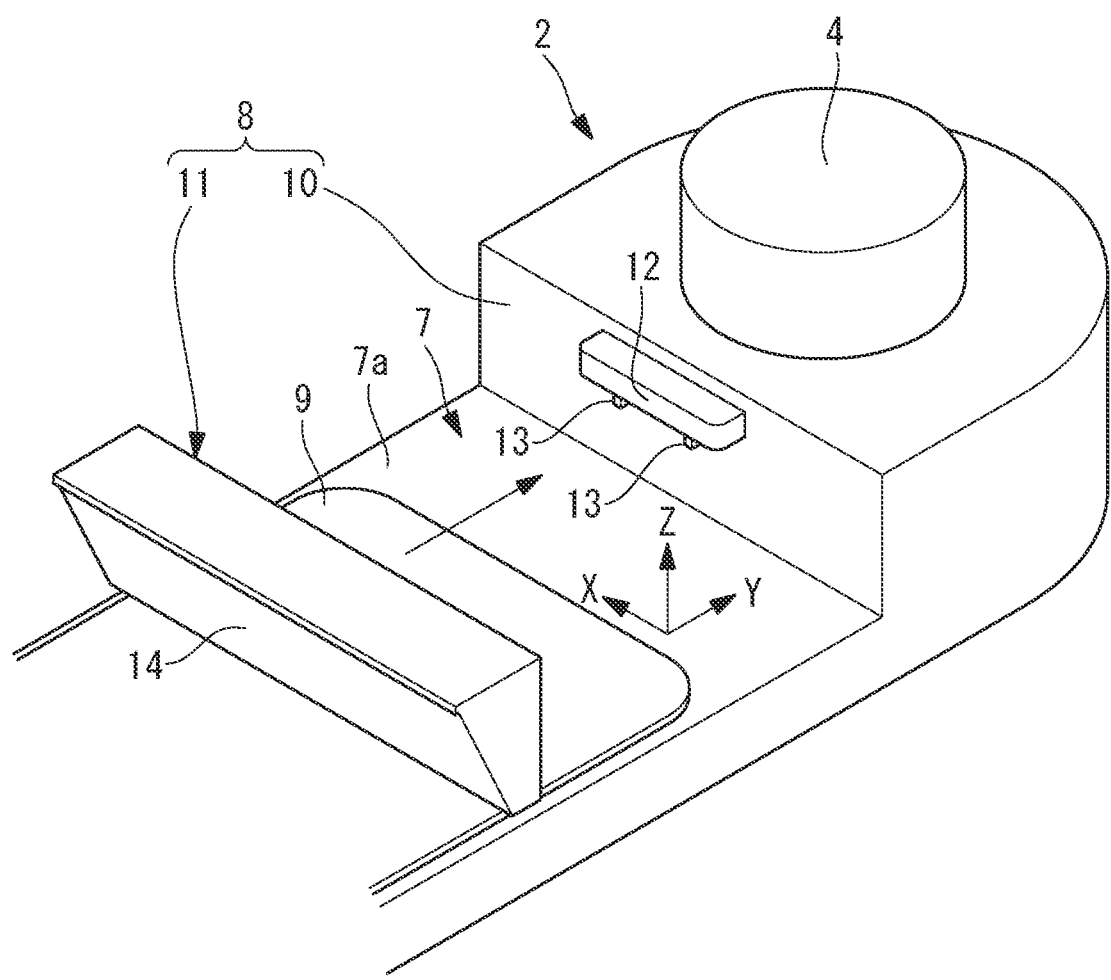
FIG. 7 is a perspective view explaining that the first holding portion of the first elastic member of FIG. 6 is attached to a protruded contact surface.

As shown in FIGS. 5 and 7, the first holding portion 8 includes a protruded contact surface (a base portion at the main body side) 10 which extends from one end of the flat surface 7a in the Y direction and in Z directions which are orthogonal to the flat surface 7a so that the protruded contact surface 10 comes into contact with one end edge of the mobile terminal 100. Also, the first holding portion 8 includes a first elastic member 11 which is removably attached to the protruded contact surface 10, and which is made of an elastic material.

Figure 8:
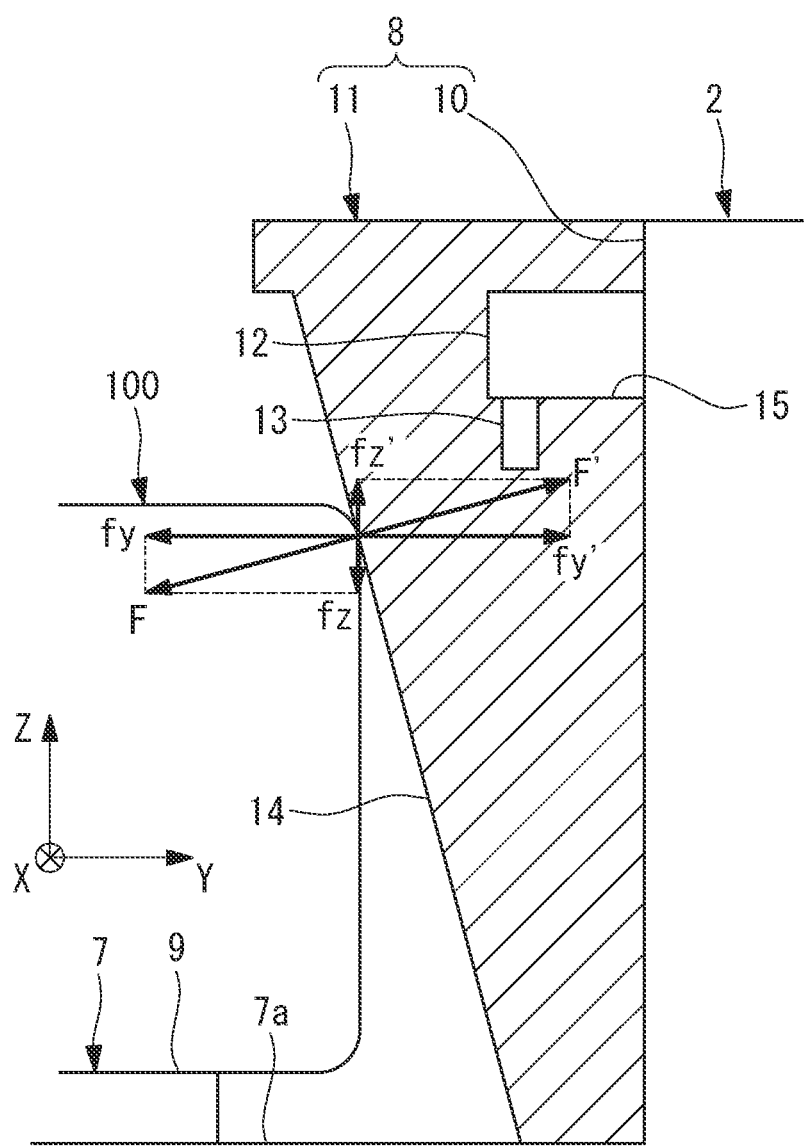
FIG. 8 is a longitudinal sectional view showing a part of the first holding portion of FIG. 5.

As shown in FIGS. 7 and 8, a protrusion (a protruding portion) 12 which protrudes in the Y direction is provided on the protruded contact surface 10, and hook parts 13 are provided on the protrusion 12. The hook parts 13 are arranged at two positions with a space in the X direction so as to protrude in a direction getting close to the flat surface 7a along a Z direction.

As shown in FIG. 5, the first elastic member 11 includes an inclined surface 14 which is a plane surface inclined so as to be distant from the protruded contact surface 10 in the Y direction as being distant from the flat surface 7a in the Z direction in a state where the first elastic member 11 is attached to the protruded contact surface 10.

Figure 6:
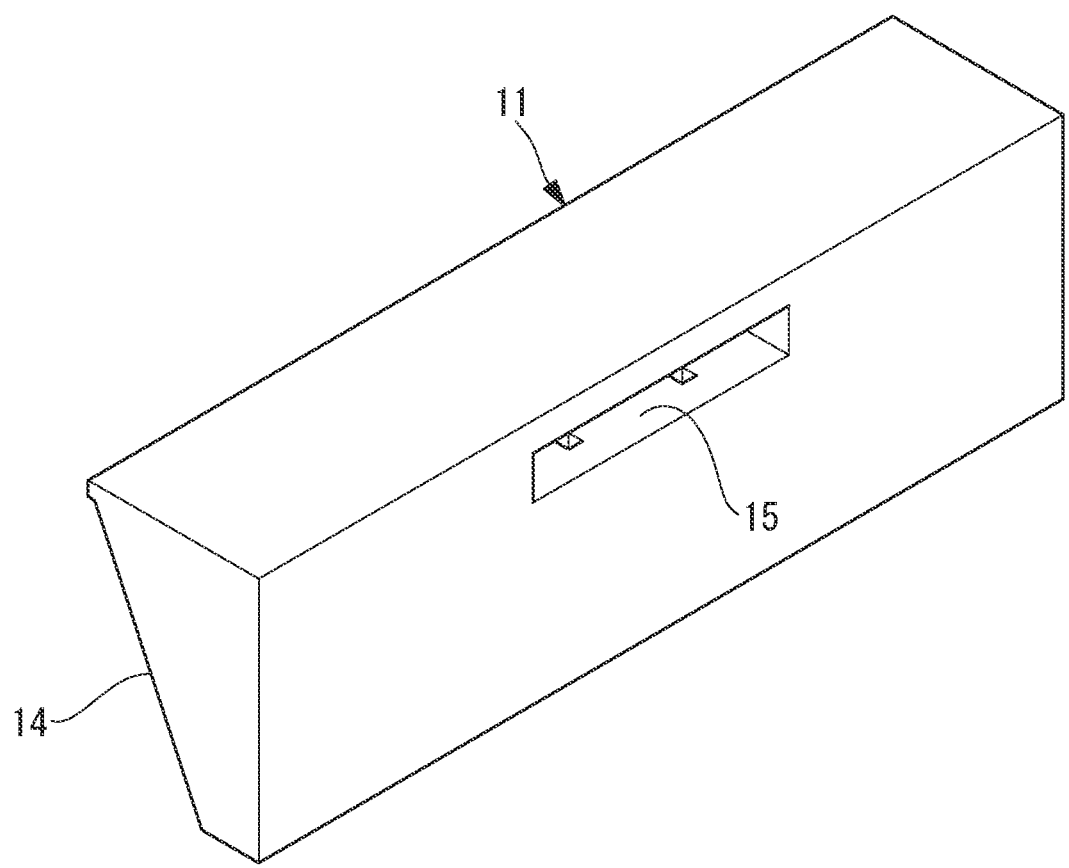
FIG. 6 is a perspective view showing a back side of a first elastic member provided in the first holding portion of FIG. 5.

Also, as shown in FIG. 6, the first elastic member 11 is provided with a recessed portion 15 having a shape (a shape complementary with the protrusion 12 and the hook parts 13) into which the protrusion 12 and the hook parts 13 of the protruded contact surface 10 are fitted. The first elastic member 11 is attached to the protruded contact surface 10 by fitting the protrusion 12 and the hook parts 13 in the recessed portion 15 while deforming the recessed portion 15 by elastic deformation and restoring the elastically deformed shape of the recessed portion 15.

Figure 9:
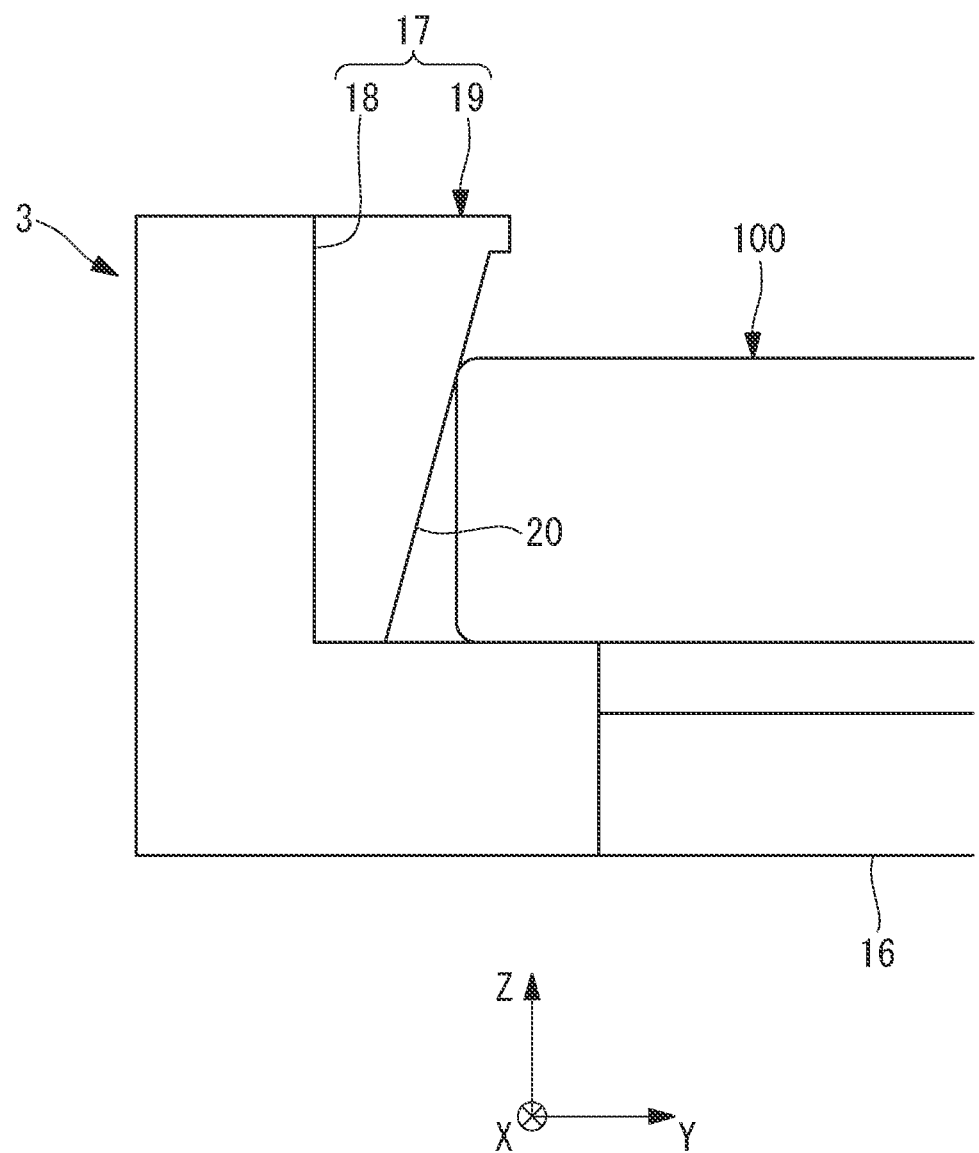
FIG. 9 is an enlarged view partially showing a second holding portion of the safety switch device of FIG. 1.

As shown in FIG. 1, the slider 3 includes a strip-shaped sliding portion 16 which is housed in a groove (not shown) provided in the device main body 2 so as to be movable in the Y direction, and a second holing portion (movable-portion-side holding portion) 17 provided at one end of the sliding portion 16. As shown in FIG. 9, the second holding portion 17 also includes a protruded contact surface (a base portion at the movable portion side) 18 which extends from the sliding portion 16 in the Z directions orthogonal to the Y direction so that the protruded contact surface 18 abuts against one end edge of the mobile terminal 100, and a second elastic member 19 which is removably attached to the protruded contact surface 18, and which is made of an elastic material.

The second elastic member 19 also has an inclined surface 20 which is a plane surface inclining in a direction so as to be distant from the protruded contact surface 18 in the Y direction as being distant from the flat surface 7a of the device main body 2 in the Z direction in a state where the second elastic member 19 is attached to the protruded contact surface 18.

Also, similar to or the same as the protruded contact surface 10, the protruded contact surface 18 also includes a plate-like protrusion which protrudes in the Y direction, and hook parts are provided on the protrusion. The hook parts are arranged at two positions with a space in the X direction so as to protrude in a direction getting close to the flat surface 7a along the Z direction.

The second elastic member 19 is provided with a recessed portion having a shape into which the protrusion and the hook parts of the protruded contact surface 18 are fitted. The second elastic member 19 is removably attached to the protruded contact surface 18 by fitting the protrusion and the hook parts into the recessed portion while deforming the recessed portion by elastic deformation, and restoring the elastically deformed shape of the recessed portion. The figures of the protrusion of the protruded contact surface 18 and the recessed portion of the second elastic member 19 are omitted because the shapes thereof are similar to or the same as those of the protruded contact surface 10 and the first elastic member 11.

As shown in FIGS. 1 and 2, the first holding portion 8 and the second holding portion 17 are placed at positions opposite to each other in the Y direction. Therefore, the inclined surface 14 of the first elastic member 11 provided in the first holding portion 8 and the inclined surface 20 of the second elastic member 19 provided in the second holding portion 17 are inclined in the direction in which the inclined surfaces 14 and 20 get close to each other as getting distant from the flat surface 7a in the Z direction.

The operation of the safety switch device 1 according to this embodiment having the above mentioned configuration will be described below.

The safety switch device 1 according to this embodiment is used with the mobile terminal 100 attached thereto.

Multifunctional mobile phones (smart phones) or tablet terminals or the like can be used as the mobile terminal 100. In order to attach the mobile terminal 100 to the safety switch device 1, the slider 3 is pulled in the device main body 2 in the Y direction, and the back surface of the mobile terminal 100, which is placed between the first holding portion 8 and the second holding portion 17, comes into close contact with the sheet 9 of the flat surface 7a.

In this state, the slider 3 is pushed against the device main body 2 in the Y direction, and the mobile terminal 100 is held between the first holding portion 8 and the second holding portion 17. By this, the mobile terminal 100 is attached to the safety switch device 1. The position of the slider 3 with respect to the device main body 2 can freely be changed in the Y direction. Therefore, it is possible to attach mobile terminals 100 of different sizes to the safety switch device 1 easily.

In this state, the inclined surface 14 of the first elastic member 11 provided in the first holding portion 8 comes into close contact with one end edge of the mobile terminal 100 in the Y direction as shown in the FIG. 5. On the other hand, the inclined surface 20 of the second elastic member 19 provided in the second holding portion 17 comes into close contact with the other end edge of the mobile terminal 100 in the Y direction as shown in FIG. 9.

The two inclined surfaces 14, 20 are inclined in the direction so that the inclined surfaces 14, 20 get close to each other as getting distant from the flat surface 7a, therefore, as shown in FIG. 8, at a point where each of the inclined surfaces 14, 20 and the mobile terminal 100 come into close contact with each other, a pressure force F is acted on the mobile terminal 100 from the side of the inclined surfaces 14, 20 in a direction orthogonal to the inclined surfaces 14, 20. The pressure force F generates force components fy, fz in the Y direction and the Z direction. The force component fy in the Y direction is acted on the first holding portion 8 and that on the second holding portion 17 at an equal magnitude in the opposite directions, therefore the force component fy acted on the first holding portion 8 and that on the second holding portion 17 are counterbalanced with each other.

The mobile terminal 100 is pushed against the flat surface 7a of the device main body 2 by the force component fz in the Z direction. By this, the mobile terminal 100 is fixed so as not to move with respect to the device main body 2 in the Z direction. Also, the sheet 9 made of a material with higher friction coefficient is fixed to the flat surface 7a, large friction force is acted between the device main body 2 and the mobile terminal 100 in the X and Y directions. That is to say, the mobile terminal 100 cannot be moved in the X and Y directions unless force exceeding the large friction force is acted with respect to the device main body 2, and therefore the mobile terminal 100 is fixed to the device main body 2 more certainly.

Also, since the inclined surfaces 14, 20 coming into contact with one edge and the other edge of the mobile terminal 100 are provided in the first elastic member 11 and the second elastic member 19, the first elastic member 11 and the second elastic member 19 are elastically deformed at a position contacting with the mobile terminal 100 so as to increase a contact area with the mobile terminal 100. By this, the friction force generated between the first elastic member 11 and the second elastic member 19, and the mobile terminal 100, especially the friction force in the X direction is increased, which prevents the mobile terminal 100 from being moved with respect to the device main body 2 in the X direction more effectively.

Further, a ratchet mechanism (not shown) may be placed between the device main body 2 and the a slider 3 in order to move the slider 3 with respect to the device main body 2 in the Y direction and maintain the slider 3 at the moved position. In this case, an interval between the first holding portion 8 and the second holding portion 17 is adjusted gradually at a pitch of teeth of the ratchet mechanism.

In this case, by providing the first elastic member 11 to the first holding portion 8 and the second elastic portion 19 to the second holding portion 17, the mobile terminal 100 can be inserted between the first holding portion 8 and the second holding portion 17 even when the distance therebetween is adjusted in a stepwise manner, which is advantageous.

And, since the first elastic member 11 and the second elastic member 19 are removably attached to the protruded contact surfaces 10, 18, the first and the second elastic members 11, 19 can be replaced by an elastic member with an ideal shape or material in accordance with the thickness of the mobile terminal 100 which is to be attached or the shape of the edge thereof. In this case, the first elastic member 11 and the second elastic member 19 are elastically deformed and removed from the protrusion 12 and the hook portions 13, and the attachment thereof is easily performed by elastically deforming the first elastic member 11 and the second elastic member 19 so that the protrusion 12 and the hook portions 13 are fitted into the recessed portion 15.

And, the first elastic member 11 and the second elastic member 19 receive a reaction force fz' generated in a direction which is opposite to the force component fz generated in the direction pushing the mobile terminal 100 against the flat surface 7a.

In this embodiment, the hook portions 13 extend in the direction opposite to the reaction force fz' acted on the first elastic member 11 and the second elastic member 19 so as to be fitted into the recessed portion 15, which prevents the protrusion 12 from coming out from the recessed portion 15 due to the reaction force.

As shown in FIG. 4, in order to use the mobile terminal 100 which is in a state where the safety switch device 1 is attached thereto, the operator holds the device main body 2 of the safety switch device 1 placed at the back surface of the mobile terminal 100 by using the left hand or the right hand. And the operator uses the pointing finger or the thumb of the hand holding the device main body 2 to press the dead man switch 5. By this, the operator is allowed to operate the mobile terminal 100, and therefore the operator can teach the robot and the like.

Also, when the emergency stop button 4 provided in the safety switch device 1 is pushed, or the dead man switch 5 is no longer pushed while teaching the robot, the robot can be in the state of emergency stop.

In this state, the operator directly holds the device main body 2 only, but does not hold the mobile terminal 100 directly. According to this embodiment, the above configuration allows the device main body 2 to stably hold the mobile terminal 100 so that the mobile terminal 100 is not displaced in any of the directions X, Y, Z with respect to the device main body 2 when its own weight or large external force is applied to the mobile terminal 100, which is advantageous.

Also, in this embodiment, the first elastic member 11 and the second elastic member 19 include the flat and inclined surfaces 14, 20, however, instead of this, inclined surfaces 14, 20 having a curved surface may be provided. In this case, as shown in FIG. 10, the inclined surfaces 14, 20 may be curved in such a form that an angle between each of the inclined surface and the flat surface 7a of the device main body 2 becomes smaller as the inclined surfaces are distant from the flat surface 7a in the Z direction.

Figure 10:
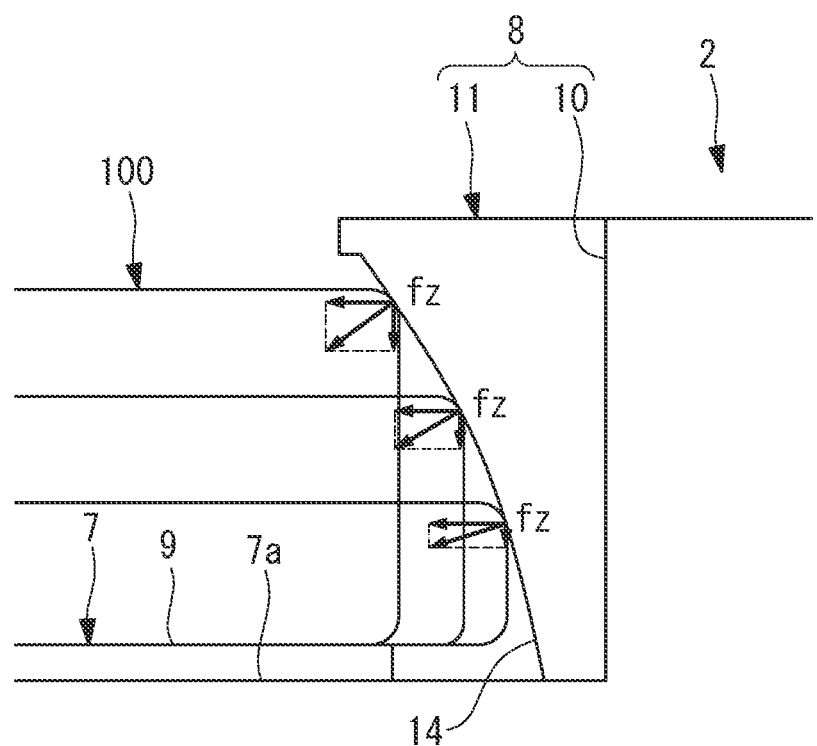
FIG. 10 is an enlarged view partially explaining a modified example of the first elastic member of FIG. 6.

By this, as shown in FIG. 10, it is possible to increase the force component in the Z direction which is applied to the mobile terminal 100 from the first elastic member 11 and the second elastic member 19 as the thickness of the mobile terminal 100 which is to be attached becomes greater and the weight thereof becomes heavier. Accordingly, the mobile terminal 100 can be held by the larger force in the XYZ directions, which is advantageous.

Also, the inclined surfaces 14, 20 are provided in the first elastic member 11 and the second elastic member 19 which are removable from the protruded contact surfaces 10, 18, but instead of this, the first elastic member 11 and the second elastic member 19 may be fixed to the protruded contact surfaces 10, 18. Also, the protruded contact surfaces 10, 18 themselves may be the inclined surfaces 14, 20 without providing the first elastic member 11 and the second elastic member 19.

Further, each of the protrusion 12 includes the hook portions 13 located at two positions with a space in the X direction, however, any number more than one of the hook portions 13 may be provided.

The invention claimed is:

1. A safety switch device comprising:
a device main body; and
a movable portion capable of moving in a predetermined moving direction with respect to the device main body, wherein
the device main body is provided with a back surface supporting portion having a supporting surface which supports a back surface of a mobile terminal and a main-body-side holding portion which pushes one side of the mobile terminal in a state where the mobile terminal is supported by the back surface supporting portion,
the movable portion is provided with a movable-portion-side holding portion which is located at a position opposite to the main-body-side holding portion in the moving direction and which pushes the other side of the mobile terminal,
each of the main-body-side holding portion and the movable-portion-side holding portion is provided with an inclined surface which comes into close contact with the one side or the other side of the mobile terminal,
each of the inclined surfaces inclines in a direction where the inclined surfaces get close to each other in the moving direction as being distant from the supporting surface in a direction orthogonal to the supporting surface, and a processing which makes an area of the supporting surface have a friction coefficient higher than that of surfaces of other portions of the device main body is performed on the area coming into close contact with the back surface of the mobile terminal, wherein the main-body-side holding portion is provided with a main-body-side base portion which extends in a crossing direction with respect to the supporting surface, and a first elastic member is attached to the main-body-side base portion, the movable-portion-side holding portion is provided with a movable-portion-side base portion which extends in a crossing direction with respect to the supporting surface, and a second elastic member is attached to the movable-portion-side base portion, and the inclined surfaces are provided in the first elastic member and the second elastic member, the first elastic member is removably attached to the main-body-side base portion, and the second elastic member is removably attached to the movable-portion-side base portion, wherein each of the main-body-side base portion and the movable-portion-side base portion is provided with a protruding portion extending in a direction in which the protruding portions get close to each other along the moving direction, and a hook portion extending from an outer surface of each of the protruding portions in a direction in which the hook portion get closer to the supporting surface, and a recessed portion having a shape into which the protruding portion and the hook portion are fitted is provided in each of the first elastic member and the second elastic member.

* * * * *